(12) United States Patent
El Haj Shhade et al.

(10) Patent No.: US 11,702,072 B2
(45) Date of Patent: Jul. 18, 2023

(54) MOTOR VEHICLE DRIVING ASSISTANCE USING MINIMUM LATERAL SHIFT OF FLUCTUATING RELEVANT OBJECT

(71) Applicant: RENAULT s.a.s., Boulogne-Billancourt (FR)

(72) Inventors: Ghayath El Haj Shhade, Paris (FR); Alain Haddad, Montigny le bretonneux (FR); Nicole El Zoghby, Le Chesnay (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 16/968,283

(22) PCT Filed: Feb. 18, 2019

(86) PCT No.: PCT/EP2019/054003
§ 371 (c)(1),
(2) Date: Aug. 7, 2020

(87) PCT Pub. No.: WO2019/162238
PCT Pub. Date: Aug. 29, 2019

(65) Prior Publication Data
US 2020/0384993 A1   Dec. 10, 2020

(30) Foreign Application Priority Data
Feb. 22, 2018   (FR) ..................................... 18 51521

(51) Int. Cl.
*B60W 30/12*   (2020.01)
*B60W 30/095*   (2012.01)
(Continued)

(52) U.S. Cl.
CPC ........ *B60W 30/12* (2013.01); *B60W 30/0956* (2013.01); *B60W 50/029* (2013.01);
(Continued)

(58) Field of Classification Search
CPC .......................... B60W 30/12; B60W 30/0956
See application file for complete search history.

(56) References Cited

U.S. PATENT DOCUMENTS

2007/0198188 A1   8/2007   Leineweber et al.
2009/0326752 A1   12/2009  Staempfle et al.
(Continued)

FOREIGN PATENT DOCUMENTS

EP   3 127 771 A2   2/2017

OTHER PUBLICATIONS

International Search Report dated Apr. 5, 2019 in PCT/EP2019/054003 filed Feb. 18, 2019, 2 pages.

*Primary Examiner* — Jess Whittington
(74) *Attorney, Agent, or Firm* — Oblon, McClelland, Maier & Neustadt, L.L.P.

(57) ABSTRACT

A device for assisting in the driving of a motor vehicle includes a line detector for detecting the boundary line of a traffic lane, a setup module capable of establishing a virtual lane from the line detected, a monitoring module capable of monitoring the risk of the motor vehicle leaving the virtual lane established. The device also includes a module for acquiring an image representing a relevant object. The setup module includes a first map containing values of a position of a virtual-lane boundary according to a lateral shift of the relevant object in the acquired image.

8 Claims, 8 Drawing Sheets

(51) Int. Cl.
*B60W 50/029* (2012.01)
*G08G 1/16* (2006.01)
*G06V 20/56* (2022.01)

(52) U.S. Cl.
CPC ........... *G06V 20/588* (2022.01); *G08G 1/167* (2013.01); *B60W 2050/0297* (2013.01); *B60W 2554/80* (2020.02); *B60W 2555/80* (2020.02)

(56) References Cited

U.S. PATENT DOCUMENTS

| | | |
|---|---|---|
| 2011/0022317 A1 | 1/2011 | Okita |
| 2015/0243017 A1* | 8/2015 | Fujimoto ................ G01S 11/12 |
| | | 348/142 |
| 2017/0010618 A1* | 1/2017 | Shashua ................ B60W 30/14 |
| 2017/0039856 A1 | 2/2017 | Park |
| 2017/0371337 A1* | 12/2017 | Ramasamy ............ G08G 1/056 |
| 2018/0201271 A1* | 7/2018 | Ishioka ................ B60W 10/18 |
| 2018/0345963 A1* | 12/2018 | Maura ................ G05D 1/0088 |
| 2018/0356833 A1* | 12/2018 | Öhman ................ B60L 5/005 |
| 2019/0016340 A1* | 1/2019 | Bae ..................... G08G 1/0129 |

* cited by examiner

MOTOR VEHICLE DRIVING ASSISTANCE USING MINIMUM LATERAL SHIFT OF FLUCTUATING RELEVANT OBJECT

BACKGROUND

The invention relates to the field of devices and methods for assisting in the driving of a motor vehicle, in particular devices and methods aiming to limit the risk of the vehicle leaving a traffic lane on the roadway.

Some motor vehicles are provided with a lane departure warning (LDW) system. The function of an LDW system is to compare an actual trajectory of the vehicle with boundary lines of a traffic lane on the roadway in order to detect the risk of the vehicle leaving the traffic lane and to warn the driver of this risk, as needed. Additionally, these same vehicles or other motor vehicles are provided with a lane keeping assist (LKA) system. An LKA system differs from an LDW system in that it acts on the directional control of the vehicle in order to correct the trajectory of the vehicle. LDW and LKA systems are referred to in the present application using the generic expression "driving assistance device".

If a roadway is poorly maintained, or the boundary lines of the traffic lanes on the roadway are not reapplied often enough, these lines may not be present or be too difficult to see to be able to be detected. In this case, conventional driving assistance devices are automatically deactivated. In this way, in the case of an LDW system, the generation of a false driver warning is prevented and, in the case of an LKA system, inappropriate interference with the trajectory of the vehicle is prevented. The deactivation of the driving assistance device is accompanied by the display of a warning light informing the driver of the unavailability of the device.

Such a solution is not entirely satisfactory, as the illumination of the warning light causes the driver consternation and the deactivation of the driving assistance device negatively affects the safety of the vehicle's occupants.

BRIEF SUMMARY

In light of the above, the object of the invention is to overcome the aforementioned drawbacks related to driving assistance devices.

More specifically, the object of the invention is to ensure the operation of a driving assistance device even if boundary lines of a traffic lane are no longer detectable.

To this end, what is proposed is a device for assisting in the driving of a motor vehicle, comprising a line detector for detecting a boundary line of a traffic lane, a setup module capable of setting up a virtual lane on the basis of the line detected, a monitoring module capable of monitoring the risk of the motor vehicle leaving the virtual lane set up.

According to one of the general features thereof, this device comprises an acquisition module for acquiring an image representative of a relevant object, the setup module comprising a first map containing values of a position of a virtual lane boundary according to a lateral shift of the relevant object in the acquired image.

The device is thus made more robust. In particular, the device operates even if it is impossible to detect a boundary line of a traffic lane.

In the present application, the term "image" is understood as the representation of a given real object produced by an optical system. Images comprise in particular tracks, which may be the track confirmed by a radar echo or the track confirmed by detection by a camera.

According to one embodiment, the setup module further comprises a second map containing values of a virtual lane width according to the country in which the vehicle is driving.

Since the second map is very simple and the invention does not require the addition of components other than software, the robustness of the device is thus increased at low cost.

In another embodiment, the first map is configured to deliver a value of a position of a virtual lane boundary by applying the relationship:

$$\lim_{adj} = y/2,$$

$$\lim_{opp} = -\lim_{adj},$$

where $\lim_{adj}$ is the relative position, with respect to a transverse plane of symmetry of the motor vehicle, of a virtual lane boundary on a side adjacent to the relevant object;

$\lim_{opp}$ is the relative position with respect to the transverse plane of symmetry of a virtual lane boundary on a side opposite the relevant object, and y is the lateral shift of the relevant object with respect to the acquisition module.

Advantageously, the first map is configured to modify the value, preferably to increase the absolute value, of the relative position of a virtual lane boundary with respect to the transverse plane of symmetry on a side opposite the relevant object if the absolute value of the respective position of a virtual lane boundary on a side adjacent to the relevant object with respect to the transverse plane of symmetry decreases by a rate of change that is lower than a predefined threshold and/or if the sum of the absolute values of the virtual lane boundaries is smaller than a predefined safety quantity.

In one embodiment, the acquisition module is configured to acquire a plurality of images representative of the relevant object, the device comprising a selector module for selecting a minimum lateral shift of the relevant object across the plurality of acquired images.

Configuring the acquisition module in such a way avoids having to subject the device to potential fluctuations of a vehicle in motion constituting the relevant object.

It is also possible to provide a measurement module for measuring a curvature of a roadside, said first map delivering various values of a virtual lane boundary position according to a curvature measured by the measurement module.

Such features allow the device to operate optimally while the motor vehicle is turning.

It is also possible to provide a calculator module for calculating a time to collision with a relevant object, the setup module being configured to input, into the first map, when a plurality of relevant objects may be used, the lateral shift of the relevant object for which the time to collision is the shortest.

These features allow the risk of collision with other vehicles to be reduced. Additionally, if the acquisition module is capable of acquiring an image of a relevant object located relatively far in front of the vehicle, the risk of collision with oncoming vehicles in an adjacent lane is reduced.

It is also possible to provide an identifier module capable of detecting a change in the lateral shift of a first roadside relative to a second roadside.

An identifier module such as this makes it possible to identify a section in which the number of lanes increases, such as a section transitioning from two to three lanes, or a section in which the number of lanes decreases, such as a section transitioning from three to two lanes.

In one embodiment, the setup module is configured to interpolate, when the identifier module detects a section in which the number of traffic lanes decreases, the lateral shift of the relevant object between a beginning and an end of the section of decrease.

In one embodiment, the setup module is configured to inhibit the operation of the device when the identifier module detects a section in which the number of traffic lanes increases between a beginning and an end of the section of increase.

According to another aspect, what is proposed is a method for assisting in the driving of a motor vehicle, wherein a boundary line of a traffic lane is detected, a virtual lane is set up on the basis of the line detected, and the risk of the vehicle leaving the virtual lane set up is monitored. If it is not possible to detect a boundary line, an image of a relevant object is acquired and a virtual lane is set up on the basis of the position of the relevant object in the acquired image.

BRIEF DESCRIPTION OF THE DRAWINGS

Other aims, features and advantages of the invention will become apparent upon reading the following description which is provided solely by way of nonlimiting example and with reference to the appended drawings, in which.

DETAILED DESCRIPTION

Figure 1:
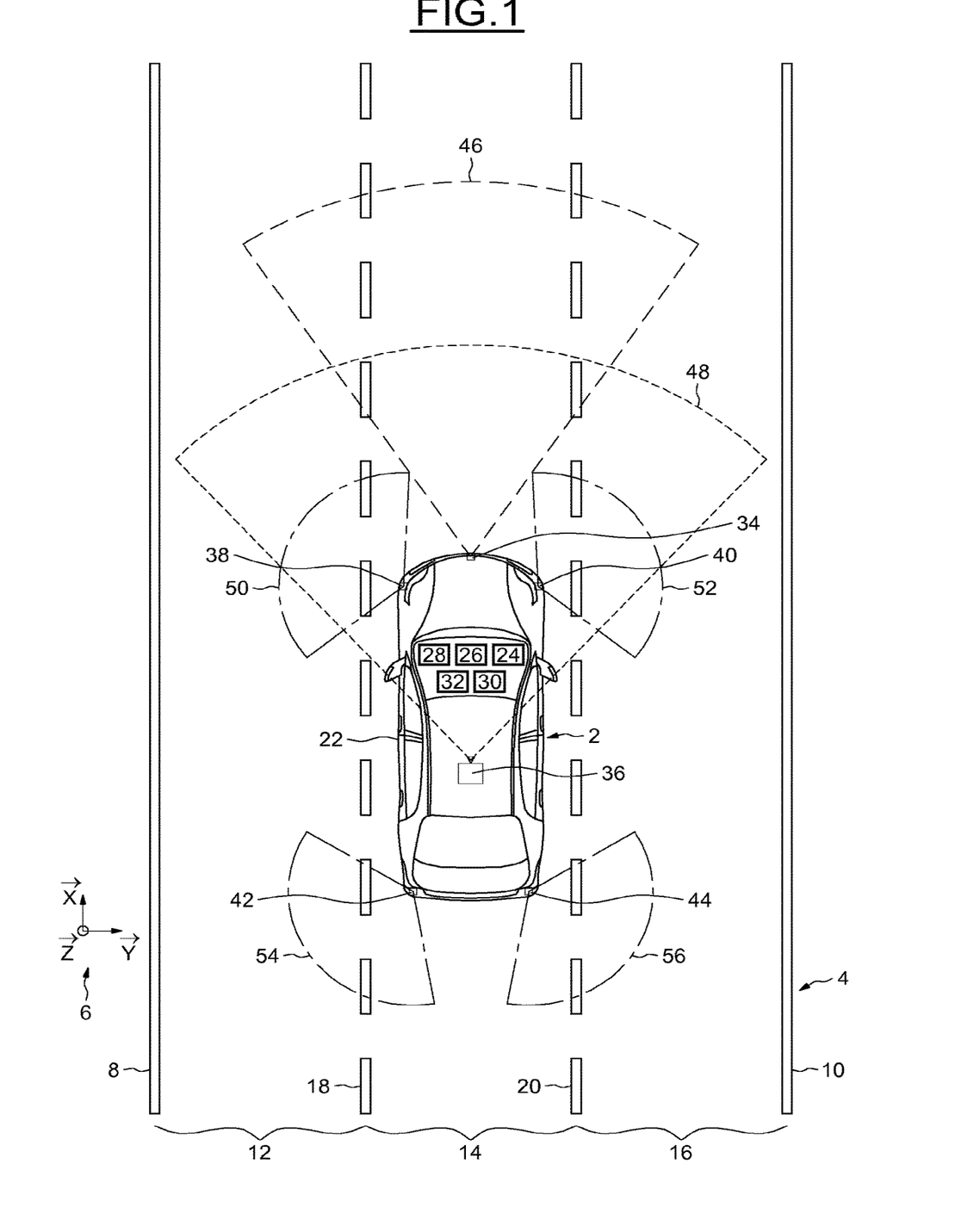
FIG. 1 is a schematic view of a motor vehicle incorporating a driving assistance device according to one aspect of the invention.

With reference to FIG. 1, a motor vehicle 2 driving on a roadway 4 is shown schematically. A direct orthonormal vector basis 6 relating to the roadway 4 is defined. The basis 6 consists of a vector $\vec{x}$, a vector $\vec{y}$ and a vector $\vec{z}$. The vector $\vec{z}$ is oriented vertically upward relative to the roadway 4. The vectors $\vec{x}$ and $\vec{y}$ are contained in a plane that is horizontal relative to the roadway 4. The vector $\vec{x}$ is longitudinal relative to the roadway 4. The vector $\vec{y}$ is transverse relative to the roadway 4.

In the present application, the terms "in front of" and "behind" will be understood with reference to the direction and orientation of the vector $\vec{x}$. Similarly, the terms "lateral", "transverse", "left" and "right" will be understood with reference to the orientation and direction of the vector $\vec{y}$. The left-hand side corresponds to the side of the tail of the vector $\vec{y}$ and the right-hand side corresponds to the side of the head of the vector $\vec{y}$.

The roadway 4 is bounded transversely by a left-hand roadside 8 and by a right-hand roadside 10.

The roadway 4 is divided transversely into three traffic lanes, in this instance a left-hand traffic lane 12, a central traffic lane 14 and a right-hand traffic lane 16. Lanes 12 and 14 are delimited by a boundary line 18. Lanes 14 and 16 are delimited by a boundary line 20. In the example illustrated, boundary lines 18 and 20 are broken white lines. However, different boundary lines may be envisaged, for example lines consisting of unbroken white lines, lines of a different color or other discontinuous shapes. Similarly, the invention is not limited to the number of lanes shown in the drawings.

The vehicle 2 includes a body 22, an onboard computer 24, a directional control device 26 and a driver interface 28. The vehicle 2 further includes a global navigation satellite system (GNNS) 30, such as for example the global positioning system (GPS). The vehicle 2 includes a module for inputting the country in which the vehicle is driven 32. The module 32 allows an operator, such as a mechanic charged with servicing the vehicle 2, to input the country in which the vehicle 2 is intended to be driven.

The vehicle 2 further includes a front radar 34, a front camera 36 and four corner radars 38, 40, 42 and 44. The components 34, 36, 38, 40, 42 and 44 make it possible to acquire images of the surroundings of the vehicle 2 in particular zones delimited in FIG. 1 by dashed lines. The zones delimited by dashed lines in FIG. 1 have intentionally been shown at an adjusted scale in order to enhance the clarity of the figure. Additionally, the position of the components 34, 36, 38, 40, 42 and 44 is schematic and it is possible to envisage different positions for these components without departing from the scope of the invention.

More particularly, the function of the radar 34 is to detect targets located in front of the vehicle 2. The radar 34 makes it possible in particular to detect targets located relatively far away from the vehicle 2. These targets may in particular comprise other vehicles driving on the roadway 4, road signs or else obstacles. To this end, the radar 34 is positioned in a grille (not shown) of the vehicle so as to view an acquisition zone 46 located in front of the vehicle 2. The radar 34 may equally be positioned behind a secondary surface such as the bumper or a holographic logo. The zone 46 is delimited by a dashed line formed of a series of long dashes. The range of the radar 34 is between 200 m and 300 m, preferably substantially 250 m.

The function of the camera 36 is to detect and to track the roadsides 8 and 10. The camera 36 is positioned on a front edge of the roof of the vehicle or in an upper central zone of the windshield so as to acquire images in an acquisition zone 48 which is delimited schematically in FIG. 1 by a series of dots. The acquisition zone 48 is primarily located in front of the vehicle 2. The zone 48 is delimited by a dashed line formed of a series of short dashes. The range of the front camera 36 is between 100 m and 150 m, preferably about 125 m. However, it is possible to use a camera other than the camera 36, for example a camera with a range of about 200 m, without departing from the scope of the invention. It is also possible to use a plurality of cameras covering the front and rear of the vehicle 2 between them.

The function of the radars 38, 40, 42 and 44 is to detect targets located at relatively near or medium distances with respect to the vehicle 2. These targets may in particular be other vehicles driving on the roadway 4. The radars 38, 40, 42, 44 acquire images in the respective acquisition zones 50, 52, 54, 56 which are represented schematically in FIG. 1 by dashed lines formed of a series of long and short dashes in alternation. The radar 38 is positioned on a front-left corner of the body 22. The radar 40 is positioned on a front-right corner of the body 22. The radar 42 is positioned on a rear-left corner of the body 22. The radar 44 is positioned on a rear-right corner of the body 22. The radars 38 and 40 have a range of about 80 m to 100 m in front, preferably of about 90 m in front, and a range of 30 m to 50 m to the side, preferably of about 40 m to the side. Similarly, the radars 42 and 44 have a range of about 80 m to 100 m behind, preferably of about 90 m, and a range of 30 m to 50 m to the side, preferably of about 40 m.

The invention is not limited to this choice of image acquisition means. According to one particular variant, it is possible to use a trifocal camera comprising a first sensor with an aperture angle of 28° and a range of 180 m, a second sensor with an aperture angle of 52° and a range of 120 m, and a third sensor with an aperture angle of 150° and a range of 60 m.

Figure 2:
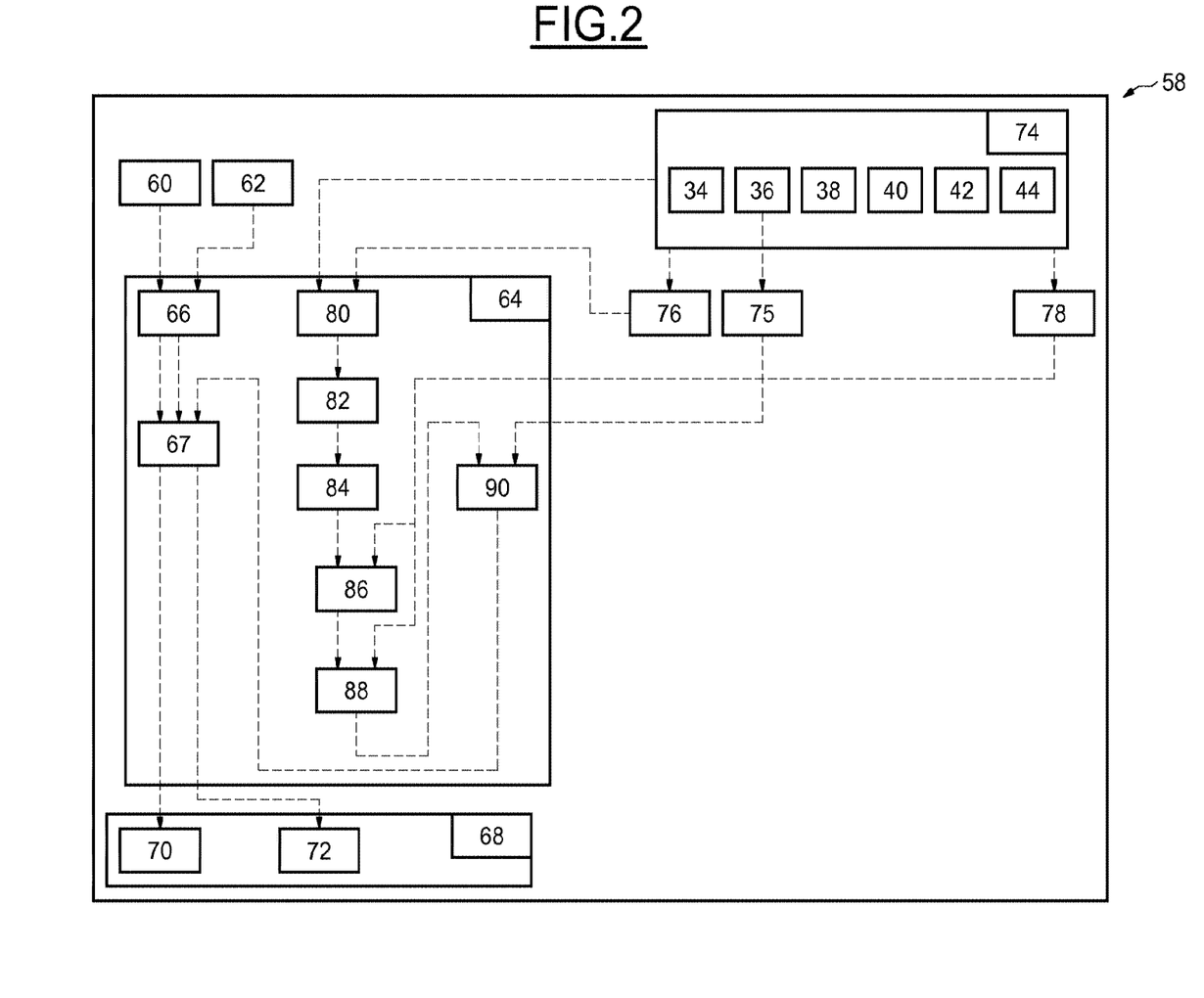
FIG. 2 is a schematic representation of the assistance device of the vehicle of FIG. 1.

The vehicle 2 includes a driving assistance device 58. The device 58 is shown in FIG. 2. The driving assistance device 58 performs both the LDW and the LKA functions. However, it is of course possible to envisage a driving assistance device implementing only one of these two functions without departing from the scope of the invention.

The device 58 comprises a detector for detecting the left-hand line 60 and a detector for detecting the right-hand line 62. The detectors 60 and 62 are line recognition sensors positioned on the left- and right-hand sides, respectively, of the body 22. Consequently, the detectors 60 and 62 are capable of detecting the presence and the position, relative to the body 22, of the respective lines 18 and 20. Although, in the example illustrated, specific sensors are provided for detecting the lines 18 and 20, it is possible to use the radars 34, 38, 40, 42, 44 or the camera 36 to detect the presence and the position of the lines 18 and 20 without departing from the scope of the invention. In the case in which a plurality of these acquisition or detection means are used to detect the presence and the position of the lines 18 and 20, the information redundancy allows the robustness of the device 58 to be increased. If the detector 60 is unable to detect a boundary line of the traffic lane, it transmits a signal $IMP_{60}$. Similarly, the detector 62 transmits a signal $IMP_{62}$ if it cannot detect the boundary line of the traffic lane.

The device 58 includes a setup module 64. The function of the module 64 is to set up a virtual traffic lane for the vehicle 2 on the basis of the available information. To achieve this, the module 64 includes a first calculator 66 with a data link to the detectors 60 and 62. The calculator 66 is able to determine, on the basis of the information collected, the values of two boundary positions of a virtual lane. A second calculator 67 has a data link to the calculator 66 and to the onboard computer 24 in order to receive the speed of movement of the vehicle 2 and the actuation of a turning indicator of the vehicle 2. The calculator 67 compiles the information collected in order to establish whether the vehicle 2 is departing from the virtual lane without this being intentional on the part of the driver. If this is indeed the case, there is a risk of the vehicle 2 departing from the lane 14 and the calculator 67 transmits a warning signal. To establish the risk of departing from the virtual lane, the calculator 67 may, in a manner known per se, compare the trajectory followed by the vehicle 2 with the virtual lane boundaries.

The device 58 includes a monitoring module 68. The module 68 includes a warning block 70 and a correction block 72. The blocks 70 and 72 have a data link to the calculator 67. The function of the block 70 is to actuate, if the calculator 67 transmits a warning signal, a warning light on the driver interface 28. The function of the block 72 is to modify, if the calculator 67 transmits a warning signal, the trajectory followed by the vehicle 2 in order to remove the risk of the vehicle 2 departing from the lane 14. To this end, the block 72 is provided with hardware and software means for generating a corrected direction setpoint and for transmitting the corrected direction setpoint to the directional control device 26.

The device 58 includes an acquisition module 74. The module 74 includes the radar 34, the camera 36 and the radars 38, 40, 42 and 44. Consequently, the module 74 is capable of acquiring, over a given period, a plurality of images of the vehicle's surroundings in the acquisition zones 46, 48, 50, 52, 54 and 56. In so doing, the module 74 sets up a multisensor model.

The device 58 includes a measurement module 75. The module 75 has a data link to the camera 36. The module 75 is provided with hardware and software means for determining whether the roadway 4 features a turn and, if so, for measuring a radius of curvature $R_8$ of the roadside 8 and a radius of curvature $R_{10}$ of the roadside 10. The module 75 additionally calculates the average $R_{8-10}$ of the radii $R_8$ and $R_{10}$. If the roadway 4 features no turn, the module 75 transmits a signal $IMP_{75}$.

The device 58 includes a calculator module 76. The module 76 has a data link to the module 74, to the onboard computer 24 and to the directional control device 26. The function of the module 76 is to calculate, whatever the nature of the target x detected by the acquisition module 74, e.g. an obstacle or another vehicle, a time to collision $TTC_x$ between the vehicle 2 and the target x.

The device 58 includes an identifier module 78. The module 78 has a data link to the module 74. More specifically, the module 78 receives the relative positions of the roadsides 8 and 10 with respect to the body 22. The module 78 is thus able to detect an increase or decrease in the distance between the roadsides 8 and 10, and hence to detect a section of the roadway 4 in which the number of traffic lanes increases or a section of the roadway 4 in which the number of traffic lanes decreases. According to one variant, the module 78 may receive information from an integrated map and/or from the system 30 on a section of the roadway 4 in which the number of traffic lanes increases or decreases.

The module 64 includes a minimum block 80. The block 80 has a data link to the modules 74 and 76. The block 80 receives images acquired by the module 74 that are representative of relevant objects. The relevant objects represented may for example be another motor vehicle driving on the roadway 4, an obstacle or a road sign. The time to collision calculated by the module 76 is associated with each relevant object. The block 80 selects those images representative of the relevant object that have the shortest time to collision.

The module 64 includes a calculating means 82. The function of the means 82 is to measure, across the images selected by the block 80, a lateral shift y of the relevant object. In this instance, the relative shift y is measured with respect to a plane of symmetry $P_{symmetry}$ (not shown) of the body 22 perpendicular to the vector $\vec{y}$.

The module 64 includes a selector module 84. The module 84 is provided with hardware and software means for selecting, over a predetermined duration, the minimum value of the shift y calculated by the means 82. The predetermined duration may be calibrated according to driver experience, performance and robustness. In the example illustrated, the predetermined duration is between 0.5 second and 1.5 seconds, and preferably about one second.

The module 64 includes an interpolation block 86. The block 86 has a data link to the modules 84 and 78. The function of the block 86 is to identify a normal value of lateral shift of a relevant object in a situation in which the number of lanes on the roadway 4 decreases. To this end, the block 86 delivers the value of the shift y if the module 78 detects no section in which the number of lanes decreases. If a section in which the number of lanes decreases is detected, the block 86 adds a value $y_{inter}$ to the shift y. The value $y_{inter}$ is zero at the beginning of the section of decrease. At the end of the section of decrease, the value $y_{inter}$ is equal to the value of the shift y at the beginning of the section of decrease. Between the beginning and the end of the section of decrease, the value $y_{inter}$ is determined by interpolation between its values at the beginning and at the end of the section of decrease. The signal delivered by the block 86, corresponding to the potentially modified lateral shift, is denoted by $y_2$.

The module 64 includes an inhibitor block 88. The block 88 has a data link to the block 86 and to the module 78. The function of the block 88 is to inhibit the operation of the device 58 while the vehicle is driving through a section in which the number of traffic lanes increases. To this end, the block 88 delivers the value of the shift $y_2$ if the module 78 detects no section in which the number of traffic lanes increases. Otherwise, the block 88 transmits an error value resulting in the deactivation of the device 58 and the activation of a warning light on the driver interface 28.

The module 64 includes a map 90 containing boundary position values $lim_{adj}$ and $lim_{opp}$ according to the shift $y_2$. The positions $lim_{adj}$ and $lim_{opp}$ correspond to the relative virtual lane boundaries with respect to the transverse plane $P_{symmetry}$. The position value $lim_{adj}$ corresponds to a virtual lane boundary on a side adjacent to the relevant object. The position value $lim_{opp}$ corresponds to a virtual lane boundary on a side opposite the relevant object. The map 90 has a data link to the block 88, to the detectors 60 and 62 and to the module 75.

The map 90 is configured to deliver values only if the detectors 60 and 62 are unable to detect the lines 18 and 20. To this end, a value is delivered only if the impossibility of detection signal $IMP_{60}$ transmitted by the detector 60 and the impossibility of detection signal $IMP_{62}$ transmitted by the detector 62 are input into the map 90. It is possible to envisage a map 90 that delivers values if only one of the detectors 60 and 62 is unable to detect a line without departing from the scope of the invention. In this case, a value is delivered only if one signal $IMP_{60}$ or $IMP_{62}$ is input into the map 90.

When the signals $IMP_{60}$, $IMP_{62}$, $IMP_{75}$ and $y_2$ are input into the map 90, the map delivers values $lim_{adj}$ and $lim_{opp}$ by applying the relationships:

$$lim_{adj} = y_2/2, \text{ and}$$

$$lim_{opp} = -lim_{adj}.$$

In the example illustrated, the map 90 is configured to account for risks related to a deviation in the vehicle constituting the relevant object or different fluctuations in the virtual lane boundaries. More specifically, the map 90 is configured to deliver different values $lim_{adj}$ and $lim_{opp}$ if at least one of the following conditions is met:

$$|y_2| < W_{veh} + 2 \cdot W_{cal},$$

$$\frac{d}{dt}(|lim_{adj}|) < var, \text{ or}$$

$$|lim_{adj}| + |lim_{opp}| < W_{voie\_min},$$

where $w_{veh}$ is the width of the motor vehicle, $w_{cal}$ and $w_{voie\_min}$ are predefined safety quantities and var is a predefined negative rate of change. The sum $|lim_{adj}|+|lim_{opp}|$ corresponds to the width of the virtual lane set up by the module 64.

If $|y_2|<w_{veh}+2.w_{cal}$, then the map 90 transmits an error value resulting in the deactivation of the device 58 and the activation of a warning light on the driver interface 28.

If $|y_2|>w_{veh}+2.w_{cal}$ and $d/dt(|lim_{adj}|)<var$, the map 90 replaces the boundary value $lim_{opp}$ with a new value calculated by applying the equation:

$$|lim_{opp}| = \frac{W_{voie}}{2},$$

where $w_{voie}$ is a predefined value or a value delivered by a map (not shown) containing standard widths for traffic lanes according to the country in which the vehicle is being driven.

If $|y_2|>w_{veh}+2.w_{cal}$ and $|lim_{adj}|+|lim_{opp}|<w_{voie\_min}$, the map 90 replaces the boundary value $lim_{opp}$ with a new value calculated by applying the equations:

$$|lim_{opp}|=-|lim_{adj}|+w_{voie},$$

$$\text{sign }(lim_{opp})=-\text{sign }(lim_{adj})$$

where $w_{voie}$ is a predefined value or a value delivered by a map (not shown) containing standard widths for traffic lanes according to the country in which the vehicle is being driven.

If the map receives a radius $R_{8-10}$ instead of the signal $IMP_{75}$, the map calculates the values $lim_{adj}$ and $lim_{opp}$ by applying the above equations and modifies these values so that the virtual lane boundaries exhibit a radius of curvature that is equal to the radius $R_{8-10}$.

Figure 3:
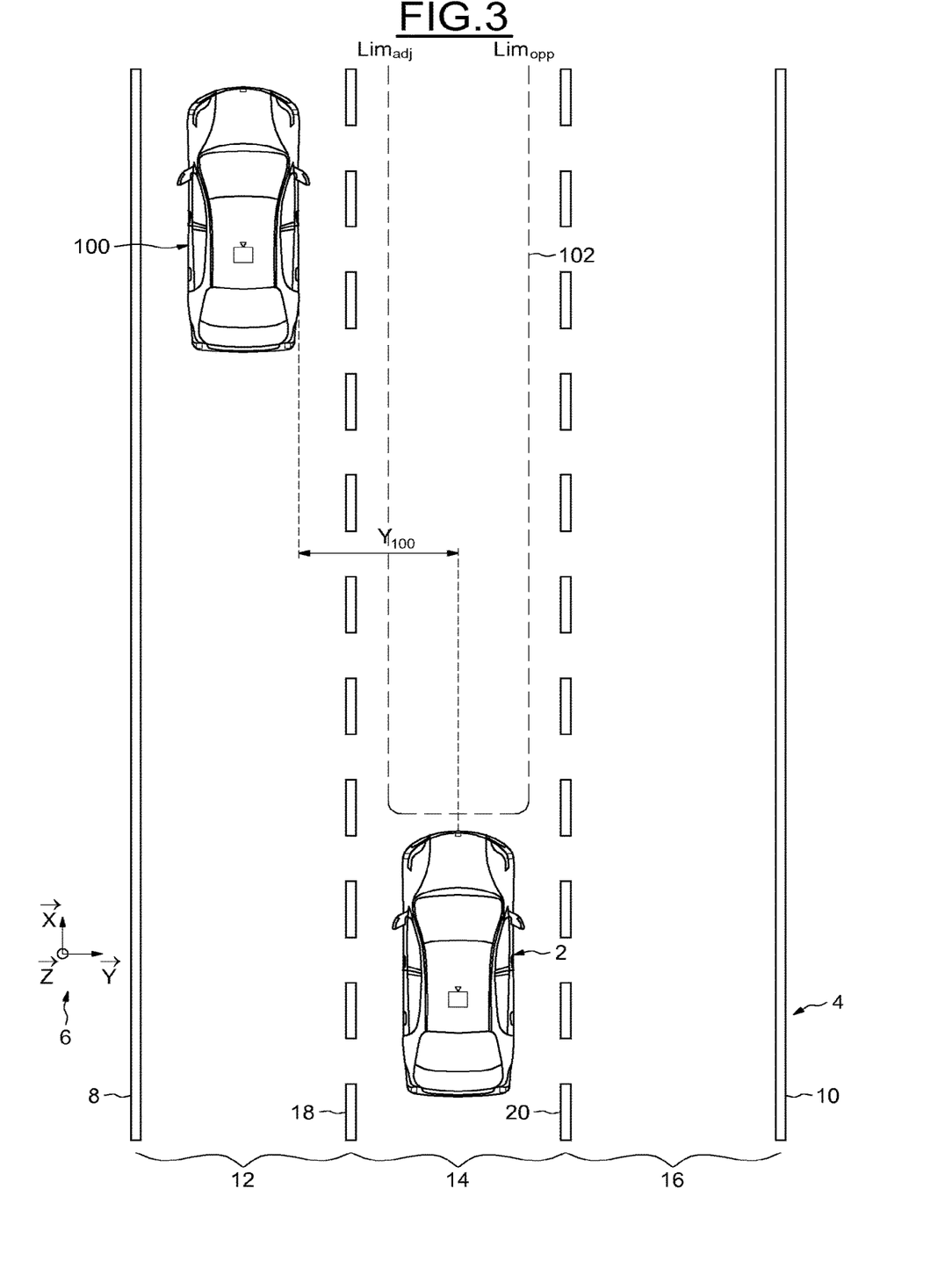
FIG. 3 schematically shows the vehicle of FIG. 1 in a first operational situation.

With reference to FIG. 3, the vehicle 2 is schematically shown in a first operational situation. Elements that are identical bear the same reference signs.

Another motor vehicle 100 is driving in the traffic lane 12 on the roadway 4 ahead of the vehicle 2. Substantially at a longitudinal position of the vehicle 2, the lines 18 and 20 are not visible on the roadway 4.

In this operational situation, the module 74, in this instance the camera 36 and the radar 38, acquires images representative of the vehicle 100. At the same time, the detectors 60 and 62 transmit the signals $IMP_{60}$ and $IMP_{62}$. The calculator 66 is then deactivated. Since the roadway 4 is straight, the module 75 transmits the signal $IMP_{75}$. The images acquired by the module 74 are transmitted by the block 80 to the module 82. The module 82 calculates the lateral shift $y_{100}$ of the vehicle 100 with respect to the vehicle 2. The signals $y_{100}$, $IMP_{60}$, $IMP_{62}$ and $IMP_{75}$ are transmitted via the blocks 86 and 88 to the map 90 which delivers the values $lim_{adj}$ and $lim_{opp}$. The values $lim_{adj}$ and $lim_{opp}$ are transmitted to the calculator 67 which sets up a virtual lane 102 and subsequently determines whether the vehicle 2 is departing from the virtual lane 102 without this being the driver's intention. If the vehicle 2 is departing from the virtual lane 102, the warning signal is sent to the blocks 70 and 72 which implement the warning and corrective actions.

Figure 4:
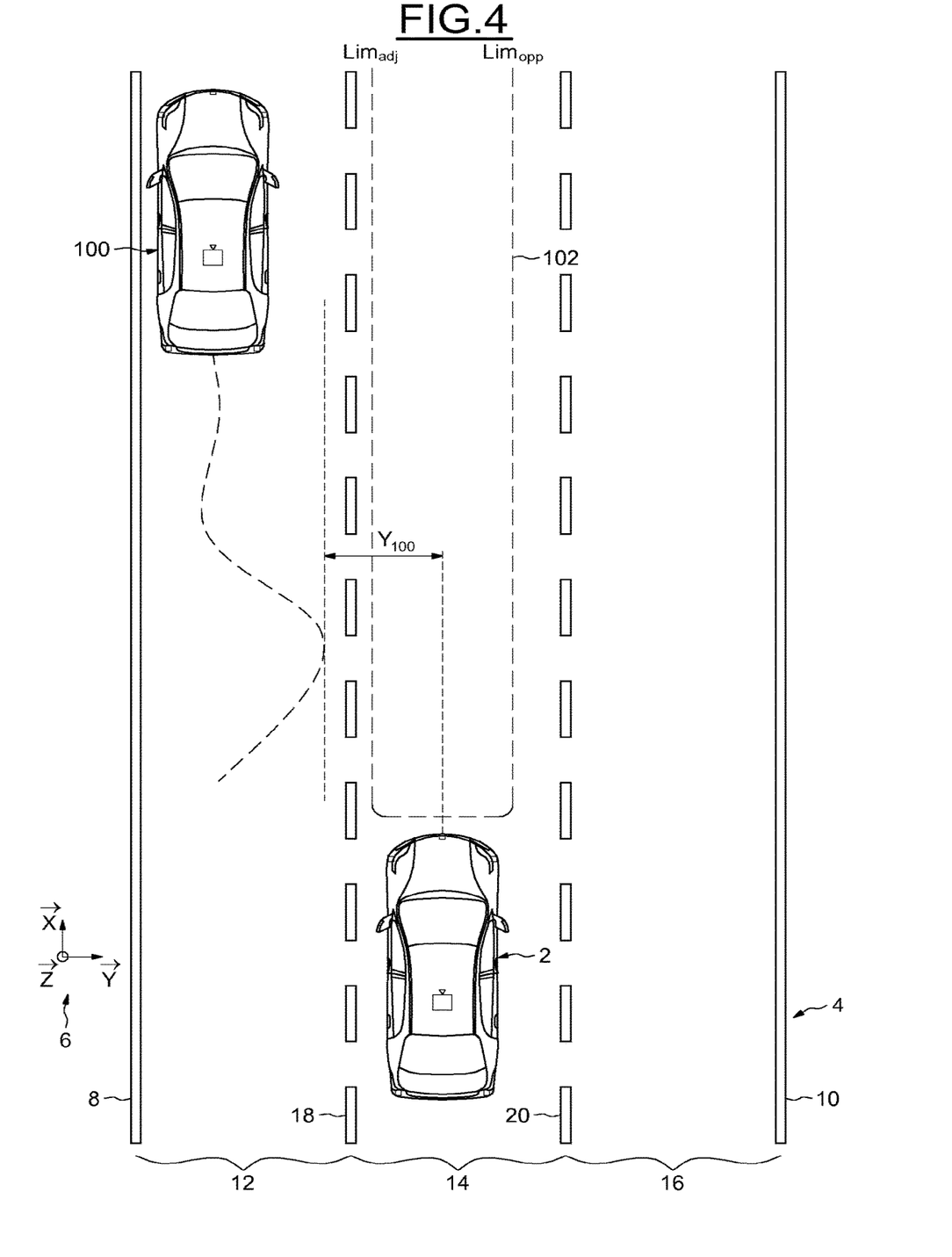
FIG. 4 schematically shows the vehicle of FIG. 1 in a second operational situation.

With reference to FIG. 4, the vehicle 2 is schematically shown in a second operational situation. Elements that are identical bear the same reference signs. In comparison with the situation of FIG. 3, the trajectory of the vehicle 100 is subject to fluctuations. The lateral shift $y_{100}$ is subject to the same fluctuations. Under these conditions, the module 84 determines a minimum lateral shift $y_{100\_min}$ over a predetermined duration. The shift $y_{100\_min}$ is subsequently used with reference to FIG. 3 to determine the values $lim_{adj}$ and $lim_{opp}$. As a result, the fluctuations in the trajectory of the vehicle 100 do not affect the virtual lane 102 boundaries.

Figure 5:
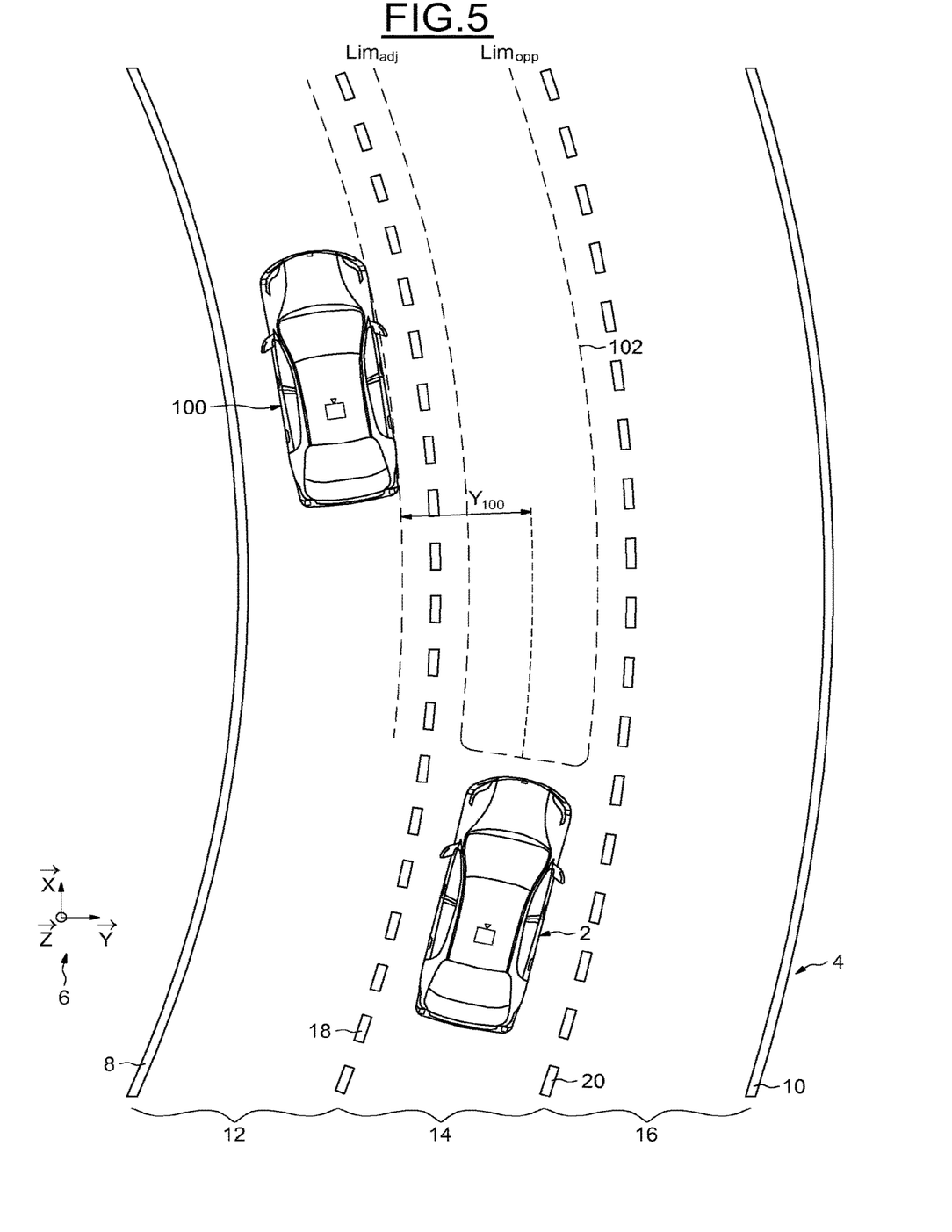
FIG. 5 schematically shows the vehicle of FIG. 1 in a third operational situation.

With reference to FIG. 5, the vehicle 2 is schematically shown in a third operational situation. Elements that are identical bear the same reference signs. In comparison with the situation of FIG. 3, the roadway 4 comprises a turn to the left. The module 75 therefore no longer transmits the signal $IMP_{75}$. Instead, the module 75 measures the radii $R_8$ and $R_{10}$ and calculates the radius $R_{8-10}$. The radius $R_{8-10}$ is input into the map 90. As a result, the radius of curvature of the virtual lane 102 boundaries is modified so as to correspond to the radius $R_{8-10}$.

Figure 6:
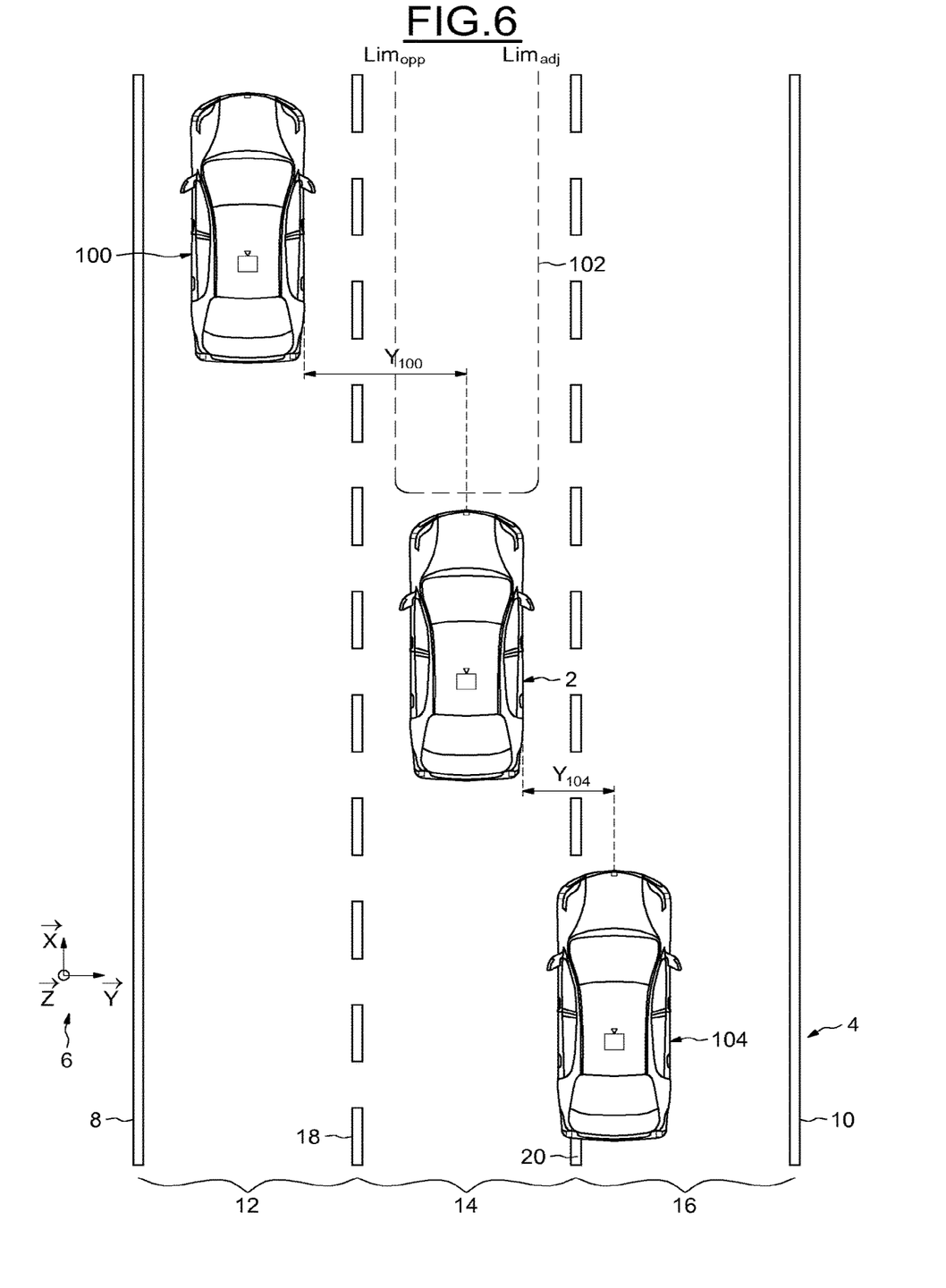
FIG. 6 schematically shows the vehicle of FIG. 1 in a fourth operational situation.

With reference to FIG. 6, the vehicle 2 is schematically shown in a fourth operational situation. Elements that are identical bear the same reference signs. In comparison with the situation of FIG. 3, a third vehicle 104 is driving on the roadway 4. The vehicle 104 is driving in the lane 16, encroaching upon the boundary line 20. Because of this, the lateral shift $y_{104}$ of the vehicle 104 is smaller, in terms of absolute value, than the shift $y_{100}$. The speed of the vehicle 104 is slightly higher than the speed of the vehicle 2 while the speed of the vehicle 100 is substantially equal to the speed of the vehicle 2. Consequently, the module 76 calculates a time to collision $TTC_{104}$ for the vehicle 104 that is shorter than the time to collision $TTC_{100}$ for the vehicle 100. As such, only the images representative of the vehicle 104 are selected by the minimum block 80. The calculating means 82 therefore does not account for the lateral shift $y_{100}$ and the values $lim_{adj}$ and $lim_{opp}$ are established only according to the shift $y_{104}$.

Figure 7:
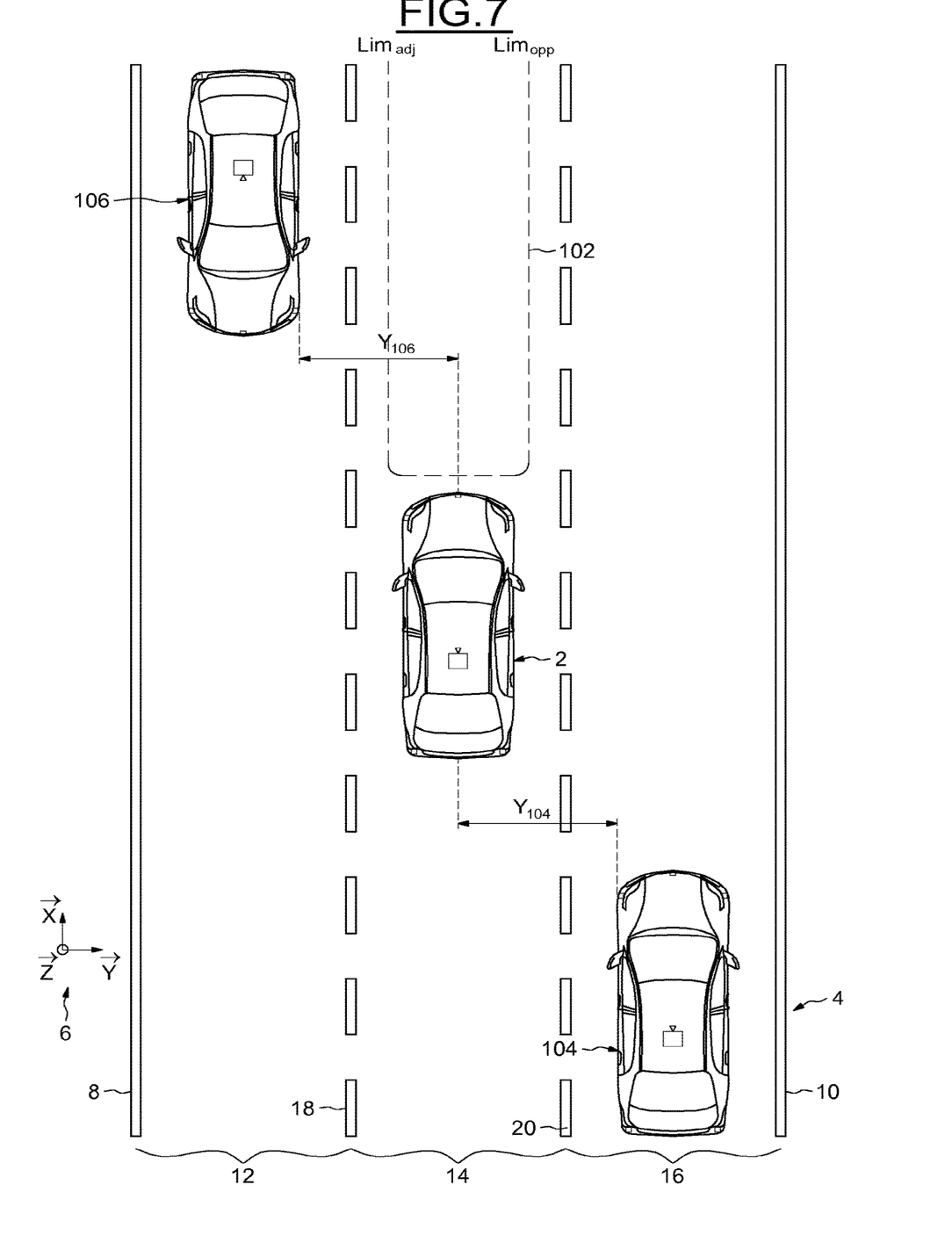
FIG. 7 schematically shows the vehicle of FIG. 1 in a fifth operational situation.

With reference to FIG. 7, the vehicle 2 is schematically shown in a fifth operational situation. Elements that are identical bear the same reference signs. The vehicle 100 of FIGS. 3 to 6 has been replaced with a vehicle 106 approaching in the opposite direction. The vehicle 106 is driving in the lane 12 on the roadway 4. The vehicle 106 is driving along the vector $\vec{x}$ in the opposite direction thereto. Although the distance between the vehicles 106 and 2 is relatively large in comparison with the distance between the vehicles 104 and 2, and the lateral shift $y_{106}$ associated with the vehicle 106 is not smaller, in terms of absolute value, than the lateral shift $y_{104}$, the time to collision $TTC_{106}$ associated with the vehicle 106 is shorter than the time to collision $TTC_{104}$ because the vehicle 104 is travelling in the opposite direction. As a result, only the images representative of the vehicle 106 will be selected by the block 80.

Figure 8:
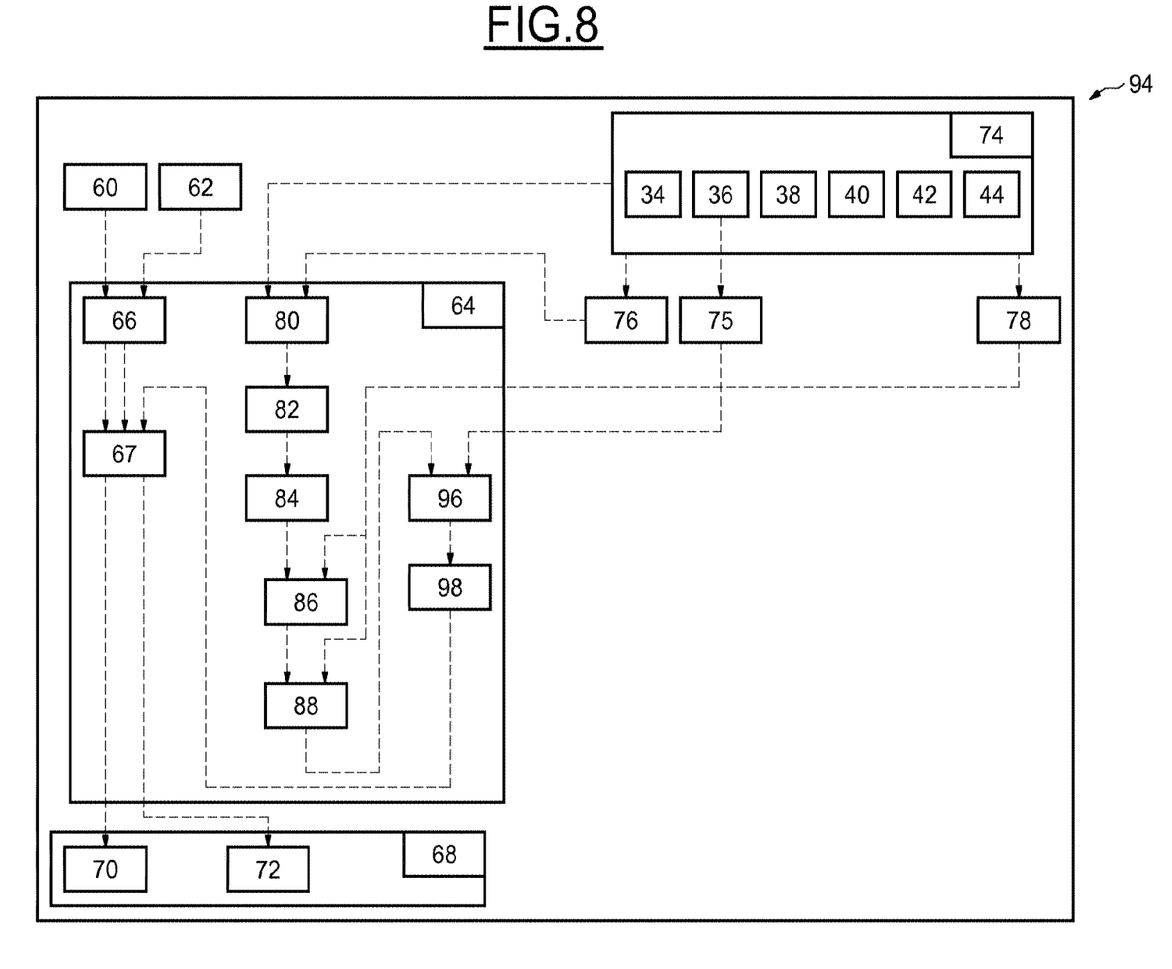
FIG. 8 shows a driving assistance device according to a variant embodiment of the invention.

With reference to FIG. 8, a driving assistance device 94 according to a second embodiment of the invention is schematically shown. Elements that are identical bear the same reference signs. In particular, the device 94 may be incorporated into the vehicle 2 instead of the device 58.

The device 94 differs from the device 58 in that the map 90 is replaced with two maps 96 and 98. The map 96 delivers an adjacent position value $lim_{adj}$ in the same way as the map 90. The map 96 does not deliver an opposite position value $lim_{opp}$. The map 98 has a data link to the input module 32. In particular, the map 98 receives information from the module 32 on the country in which the vehicle 2 is being driven. The map 98 contains values for the virtual lane width according to the country in which the vehicle is being driven. The virtual lane width is determined in particular according to the standard width of the traffic lanes in the country in which the vehicle 2 is being driven. In this way, the map 98 delivers a virtual lane width $w_{voie}$ and an opposite position value $lim_{opp}$ by applying the relationship:

$$|lim_{opp}|=-|lim_{adj}|+w_{voie} \text{ and } sign(lim_{opp})=-sign(lim_{adj}).$$

According to one variant of this second embodiment, the map 98 receives information from the GPS 30 on the country in which the vehicle 2 is being driven.

In light of the above, the driving assistance device according to the invention makes it possible to continue to provide an LDW and/or LKA function even if the boundary lines of the traffic lanes are no longer detectable. This improvement to driving assistance devices does not require the addition of any particular components other than software components. This improvement may therefore be implemented at particularly low cost.

The invention claimed is:

1. A device for assisting in driving a motor vehicle, comprising:
   a line detector configured to detect a boundary line of a first traffic lane such that the device controls the motor vehicle to stay within the boundary line of the first traffic lane;
   a setup module configured to set up a virtual lane based on the line detected;
   a monitoring module configured to monitor a trajectory of the motor vehicle to determine if the motor vehicle will leave the virtual lane set up;
   an acquisition module configured to acquire an image representative of a relevant object traveling in a second traffic lane; and
   an identifier module configured to detect a change in a lateral shift of a first roadside relative to a second roadside,
   wherein the setup module comprises a first map containing values of a position of a virtual lane boundary according to a lateral shift of the relevant object in the acquired image,
   wherein when a trajectory of the relevant object fluctuates within the second traffic lane, the setup module is configured to determine a minimum lateral shift over a predetermined duration and to apply the minimum lateral shift as the lateral shift according to which the virtual lane boundary is determined,
   wherein when the boundary line is not detected, the device controls the motor vehicle to stay within the virtual lane boundary, and
   wherein when the identifier module detects a section in which a number of traffic lanes decreases, the setup module is configured to add a value to the lateral shift, the value at a beginning of the section is zero, the value at an end of the section is equal to a value of the lateral shift at the beginning of the section and the value between the beginning and the end of the section being determined by an interpolation between zero and the value of the lateral shift at the beginning of the section.

2. The device as claimed in claim 1, wherein the setup module further comprises a second map containing values of a virtual lane width according to a standard lane width in a country in which the vehicle is driving.

3. The device as claimed in claim 1, wherein the first map is configured to deliver a value of a position of a virtual lane boundary by applying the relationship:

$$\text{limadj} = y/2,$$

$$\text{limopp} = -\text{limadj},$$

where limadj is the relative position, with respect to a transverse plane of symmetry of the motor vehicle, of a virtual lane boundary on a side adjacent to the relevant object;

limopp is the relative position with respect to the transverse plane of symmetry of a virtual lane boundary on a side opposite the relevant object, and y is the lateral shift of the relevant object with respect to the acquisition module.

4. The device as claimed in claim 3, wherein the first map is configured to modify the value of the position of a virtual lane boundary on a side opposite the relevant object when the sum of the absolute values of the boundaries of the virtual lane is smaller than a predefined safety quantity.

5. The device as claimed in claim 1, further comprising:
a measurement module configured to measure a curvature of a roadside, said first map delivering various values of a virtual lane boundary position according to a curvature measured by the measurement module.

6. The device as claimed in claim 1,
wherein the relevant object in the second lane is a first relevant object in the image acquired by the acquisition module and the image includes a second relevant object,
wherein the device includes a calculator module configured to calculate a time to collision with the first relevant object and a time to collision with the second relevant object,
wherein the setup module is configured to input, into the first map, the lateral shift of the relevant object for which the time to collision is the least among the first relevant object and the second relevant object, and
wherein the first relevant object and the second relevant object are each one of an approaching motor vehicle that drives towards the motor vehicle, a following motor vehicle that follows the motor vehicle, and a leading motor that drives ahead of the motor vehicle in the same direction as the motor vehicle.

7. The device as claimed in claim 1, wherein the setup module is configured to deactivate the device while the motor vehicle is driving through a section of road in which the identifier module detects that the number of traffic lanes increases between a beginning and an end of the section of increase.

8. A method for assisting in driving a motor vehicle, comprising:
detecting a boundary line of a first traffic lane;
controlling the motor vehicle to stay within the boundary line of the first traffic lane when the boundary line is detected;
setting up a virtual lane based on the line detected;
monitoring a trajectory of the motor vehicle to determine if the motor vehicle will leave the virtual lane set up;
when it is not possible to detect the boundary line,
acquiring an image of a relevant object traveling in a second traffic lane and setting up a virtual lane based on a relative position of the relevant object with respect to the motor vehicle in the acquired image, the setting up including, when a trajectory of the relevant object fluctuates within the second traffic lane, the setup module is configured to determine a minimum lateral shift of the relevant object over a predetermined duration and to apply the minimum lateral shift as the relative position according to which the virtual lane is set up, and
controlling the motor vehicle to stay within the virtual lane; and
detecting a change in a lateral shift of a first roadside relative to a second roadside,
when a section in which a number of traffic lanes decreases is detected, a value is added to the lateral shift,
the value at a beginning of the section is zero,
the value at an end of the section is equal to a value of the lateral shift at the beginning of the section and
the value between the beginning and the end of the section being determined by an interpolation between zero and the value of the lateral shift at the beginning of the section.

* * * * *